United States Patent [19]
Feiner

[11] 3,978,293
[45] Aug. 31, 1976

[54] RINGING CONTROL CIRCUITRY WITH SHARED RINGING LOOP CURRENT DETECTOR

[75] Inventor: Alexander Feiner, Rumson, N.J.

[73] Assignee: Bell Telephone Laboratories, Incorporated, Murray Hill, N.J.

[22] Filed: Nov. 7, 1974

[21] Appl. No.: 521,734

[52] U.S. Cl. .......................... 179/18 HB; 179/84 R
[51] Int. Cl.² ......................................... H04M 3/02
[58] Field of Search ............. 179/18 HB, 18 J, 84 R

[56] References Cited
UNITED STATES PATENTS

| | | | |
|---|---|---|---|
| 3,059,058 | 10/1962 | Abbott | 179/18 HB |
| 3,291,916 | 12/1966 | Jorgensen | 179/18 HB |
| 3,312,787 | 4/1967 | Jorgensen | 179/18 HB |
| 3,350,508 | 10/1967 | Swanson | 179/18 |
| 3,378,650 | 4/1968 | Goeller | 179/175.2 |
| 3,443,033 | 5/1969 | Louis | 179/18 HB |
| 3,492,436 | 1/1970 | Feiner et al. | 179/18 |
| 3,492,437 | 1/1970 | Feiner | 179/18 |
| 3,752,924 | 8/1973 | Freimanis | 179/84 R |
| 3,821,484 | 6/1974 | Sternung | 179/18 J |

*Primary Examiner*—Kathleen H. Claffy
*Assistant Examiner*—E. Matt Kemeny
*Attorney, Agent, or Firm*—F. W. Padden

[57] ABSTRACT

Ringing loop-current detectors are shared by groups of telephone set line circuits. A time division switching system is disclosed having a plurality of telephone line circuits and common control circuits for switching calls over a time division communication bus. Ringing loop current detectors are shared by groups of the line circuits for detecting call answer signals during active ringing on a call and for controlling the line circuits to interrupt, or trip, the ringing upon a called party answer. Each group of the line circuits is permanently connected to a ringing current supply via an individual one of the loop current detectors. Each line circuit includes ringing control circuitry operated and released by the common control circuits for connecting ringing current to a called line during an active ringing interval and for disconnecting it during a silent interval of the ringing cycle. The circuitry is responsive to a detection of a called station answer signal by the shared loop current detector for immediately tripping ringing. Apparatus is also provided in the circuitry for sensing answer signals during the silent intervals and for generating switch-hook status signals during both the silent and active ringing intervals.

8 Claims, 3 Drawing Figures

RINGING CONTROL CIRCUITRY WITH SHARED RINGING LOOP CURRENT DETECTOR

BACKGROUND OF THE INVENTION

This invention relates to incoming call signaling facilities for communication systems and particularly to circuitry for controlling single and plural phase incoming call ringing for communication line circuits. The invention further relates to time-shared call answer detection and ring tripping control circuitry for communication lines.

It has long been a commmon practice in the telephone industry to alert a called station to an incoming call by ringing a bell of the telephone instrument. Typically, the ringing occurs in cycles, each of which illustratively comprises an active interval of 1-second duration followed by a 3-second silent period. Such ringing is known in the art as noncoded ringing. The silent and active ringing intervals are slightly different for coded ringing which is widely used on multiparty lines and involves multiburst of active ringing intervals. The cycles for both coded and noncoded ringing are recurrent until the incoming call is answered or the call is abandoned. When the call is answered, ringing is terminated, or tripped, as soon as practicable to preclude a transmission of high level ringing signals through the telephone receiver to the answering party.

A problem in many prior art telephone systems is that the call answer and ring tripping circuitry must be uniquely dedicated and assigned to each called station for the entire duration of an incoming call even though it is only functional for a small percentage of the call holding time. Such circuitry is, in a substantial percentage of commercially operating telephone systems, customarily integrated into a trunk circuit which supplies ringing power to a called line via a switching network. The trunk circuit generally receives the incoming call and controls the entire ringing operation.

Each such trunk circuit is generally equipped with apparatus for activating one of a group of ringing selection switches to select an appropriate code and phase of ringing power for periodically actuating the ringer of the called telephone. The call answer detection and ring tripping circuitry in each trunk circuit is frequently a relay, or equivalent device, which is connected to the called telephone line for the recurrent cycles of silent and active ringing intervals and for sensing D.C. loop current flow over the line resultant from a called party answer. Upon detecting such loop current, the ring trip circuitry is effective to interrupt further ringing of the called station. Thereafter, the call answer and ring trip circuitry remains inactive and out-of-service for the remainder of the call. The inactivity and out-of-service factors obviously result in inefficient uses of call answer and ring trip circuitry.

In an endeavor to overcome the inefficient dedication of call answer detection and ring tripping circuitry, the art progressed in recent years to the extent that such circuitry is sometimes divorced from trunk circuits and segregated into ringing control circuits. Each of the latter circuits is switchable onto call connections to perform the entire ringing control job including the detection of a called party answer and the ring trip control functions. Importantly, after these functions are completed, the control circuit is automatically released from call connections before call conversation commences and is then made available for serving another call. Such an arrangement is disclosed, for example, in L. F. Goeller, Jr., U.S. Pat. No. 3,378,650, issued Apr. 16, 1968.

A disadvantage of the Goeller arrangement is that the common control equipment must establish several distinct connections through a switching network. One such connection is to a ringing control circuit for the ringing job. A subsequent connection is to a reserved trunk circuit for call conversation. Such an approach requires many common control equipment work operations to hunt, test and establish the network connections and undesirably requires separate network channel allocations especially for the ringing job.

The need for the latter work operations and special ringing channel allocations has been reduced by another innovation in the art as disclosed in my U.S. Pat. No. 3,492,437 of Jan. 27, 1970. Advantageously, the latter patent discloses a ringing control circuit which is time shared by a plurality of trunk circuits and which is connectable onto the same network connections as the trunk circuits for performing the ringing job. Such an arrangement enables a call answer detector and ring trip control to be shared among a plurality of trunk circuits during active ringing which is time spaced for each sharing circuit. Each such ringing control circuit is equipped with connector relays which are operated by a switching network controller to connect active ringing power and a shared called station answer detector through a trunk and line link network to a called station.

While my foregoing arrangement has proven technically reliable for commercial applications, it teaches that each ringing control circuit be associated with trunk circuits and that it be controlled by a switching network controller for performing the ringing job over connections through the switching network. In certain present day switching systems, such as time division systems, that teaching does not find practical utility because it is not usually feasible to switch ringing current from trunk circuit appearances in the network through time slot switching elements to called lines.

Moreover, no facilities have been heretofore available for eliminating the requirement in my individual ringing control circuits for circuitry which self-determines the active ringing interval and the disconnection of ringing from a call connection through the network. Such a self-determination is made by a timer arrangement in the ringing control circuits. In addition, a need has heretofore existed for eliminating the time consuming common control equipment operations for interrogating the time shared ringing control circuits to check when active ringing has been terminated either independently by the timer or by a called party answer detector.

SUMMARY OF THE INVENTION

The foregoing need is fulfilled in accordance with an illustrative embodiment of my invention which provides for the time sharing of call answer detection facilities and is advantageously suitable for use in time division switching systems. My illustrative embodiment is equipped to apply incoming call alerting signals to called lines independent of the time division switching network and by means of switching and logic circuitry in station line circuits. This eliminates any need for transmitting high level alerting, or ringing, signals through time slot switching elements in a time division system.

A group of the line circuits time share a single call answer detector which is connectable and disconnectable from called lines via the line circuits in response to signals from common control equipment. Advantageously, the duration of each connection of the answer detector to a called line is determined solely by the common control equipment for a full active ringing interval. This centralized determination eliminates the necessity of circuitry in individual line circuits for the same function and reduces the need for prior art common control curcuit and scanner interrogation of the line circuits to determine whether the answer detector has been disconnected from a called line upon termination of active ringing.

Each of the line circuits is illustratively connected permanently to the shared detector and is equipped to connect it to a called line at the beginning of an active ringing interval and to disconnect the detector from the line at the end of that interval and during the entire silent interval. My exemplary line circuit advantageously is also equipped to bridge a line supervisory relay onto the called line for sensing a called station answer during the silent interval and thereupon to control the tripping of ringing.

According to my invention, the single shared detector is advantageously used for call answer detection and ringing trip control operations with plural phase ringing arrangements for a group of called lines. In an illustrative four phase arrangement, active ringing in each phase persists for a 1-second interval followed by a 3-second silent interval and the active ringing interval of each of the phases occurs during the silent intervals of each of the other phases.

For such an arrangement, the single detector is selectably time shared by a maximum of four called line circuits at a time and while each of those line circuits is individually assigned to only one of the four ringing phases. The time sharing is accomplished by successively connecting the single detector through each of the four called line circuits to associated called station lines only during the active ringing interval of each assigned one of the four phases. The detector is successively disconnected from each of the four line circuits upon entry into a respective silent interval of the assigned one of the phases. Thus, the detector is connectable to only one rung line at a time and is responsive illustratively to loop current flow over that line during the active ringing interval for controlling the tripping of ringing.

My invention is additionally suitable for use in a communications system having a plurality of groups of communication line circuits and a plurality of call answer signal detectors for extending ringing power to the line circuits. The system further comprises common control equipment which supplies signals to the line circuits for controlling a generation of plural phases of ringing through the line circuits to respective called lines. Each of the phases is synchronized for all line groups and includes an active ringing interval followed by a silent interval. The time spacing is synchronized so that each active ringing interval for each such phase occurs during a silent interval of each of the other phases. Advantageously, the controlling signals are supplied so that each of the phases is concurrently generatable for only one of the line circuits in each of said groups. Among the significant improvements of my invention for use in such a system are that the line circuits in each one of the groups share an individual one of the detectors for detecting incoming call answer signals. Importantly, each one of the line circuits utilizes circuitry operated in response to the controlling signals from the common control equipment for connecting incoming call ringing power for one of the phases from a respective shared one of the detectors through the line circuit to a called line. Each one of the line circuits further comprises means subsequently activated by a shared one of the detectors upon a detection of a call answer signal from the called line during an active ringing interval of the respective one of the phases for releasing the connecting circuitry to terminate the active ringing interval. Resultingly, the shared detectors detect loop current call answer signals on a respective called line only during an active ringing interval of each of the phases.

It is a feature of my invention that the connecting means for each one of the line circuits comprises switch means which is operable for connecting ringing power from a respective shared one of the detectors to a called line and which is releasable for disconnecting the ringing power from that line. The connecting means advantageously comprises control means responsive to the receipt of control signals supplied by the common control equipment for operating the switch means during an active ringing interval of one of the four phases and releasing the switch means during a silent interval of that phase.

Another feature is that each of the line circuits is equipped with a line supervisory relay which is connectable to a called line during a silent interval when the shared detector is disconnected from that line. The line relay senses loop current flow over the called line and thereafter cooperates to control a termination of further ringing on the called line.

DESCRIPTION OF THE DRAWING

The foregoing features and advantages, as well as others, of this invention can be more fully understood from a reading of the following description with reference to the drawing in which.

The equipment illustrative of the principles of this invention has been designed for incorporation, by way of example, into a program controlled pulse amplitude modulation time division switching system of the type essentially as disclosed in the D. J. H. Knollman U.S. Pat. No. 3,914,559 issued Oct. 21, 1975 and assigned to the same assignee. Related subject matter is also disclosed in D. G. Hill—T. G. Lewis—P. A. Vachon, U.S. patent application Ser. No. 521,651 filed concurrently herewith, and J. F. O'Neill U.S. Pat. No. 3,916,118 issued Oct. 28, 1975 and assigned to the same assignee. It is particularly concerned with the shared ringing loop current detector, the line circuit ringing control circuitry and a ring relay switching arrangement associated with the line circuit hybrid. The other equipment elements are neither shown nor described in detail herein, except where necessary for a complete understanding of the construction and operations of our illustrative ringing equipment. Reference is also made to the J. M. Elder, Jr. U.S. Pat. No. 3,934,099 issued Jan. 20, 1976 and assigned to the same assignee, which discloses details of the hybrid suitable for use in our illustrative telephone system.

DETAILED DESCRIPTION

Figure 1:
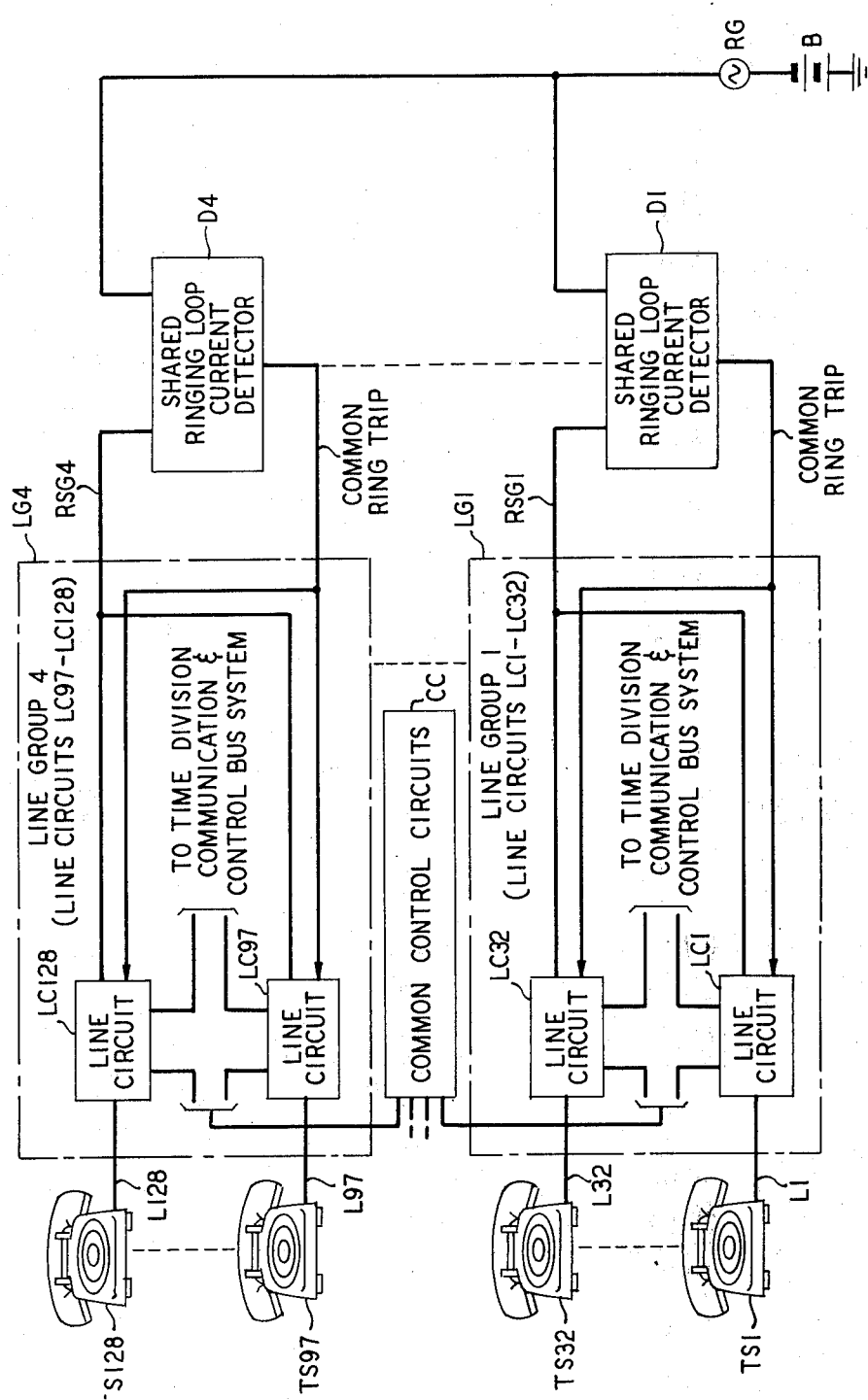
FIG. 1 is a block diagram of a time division switching system employing ringing loop current detectors shared by groups of telephone line circuits.

In FIG. 1, the illustrative TDM system comprises a plurality of telephone stations TS1-TS128 each of which is equipped with a conventional telephone ringer (not shown). The stations are connected over respective telephone lines L1-L128 to TDM line circuits LC1-LC128.

According to our exemplary embodiment, the line circuits are divided into four line groups LG1-LG4 each of which comprises 32 line circuits. Illustratively, line group LG1 comprises the line circuits LC1-LC32 and group LG4 comprises circuits LC97-LC128. Each of the line circuits is connected to a time division communication and control bus system and is equipped with circuitry which is activated over the bus system by common control circuits CC for controlling incoming telephone call ringing and the establishment, supervision and termination of time slot switch connections for transmit and receive TDM communication on such calls.

Ringing current for alerting a called one of the stations TS1-TS128 to an incoming call is, by way of example, supplied to the line circuits LC1-LC128 from a common ringing generator RG. It continuously furnishes nominal 20 cycle, 120 volts superimposed on the negative 48 volts from battery B. Generator RG is advantageously permanently connected via four ringing loop current detectors D1-D4 to the line circuits in the respective line groups LG1-LG4. Each one of the detectors D1-D4 is individual to one of the groups LG1-LG4 and is shared by all line circuits in that one group for sensing during ringing a loop current flow resultant from a called station answering (telephone off-hook) of an incoming call. To elaborate, detector D1 is shared by line circuits LC1-LC32 and detector D4 is shared by circuits LC97-LC128. Advantageously, each of the detectors D1-D4 is utilized for sensing loop current for four different phases of ringing. Detectors D1-D4 are connected to the line circuits of the respective line groups via the leads RSG1-RSG4.

Figure 2:
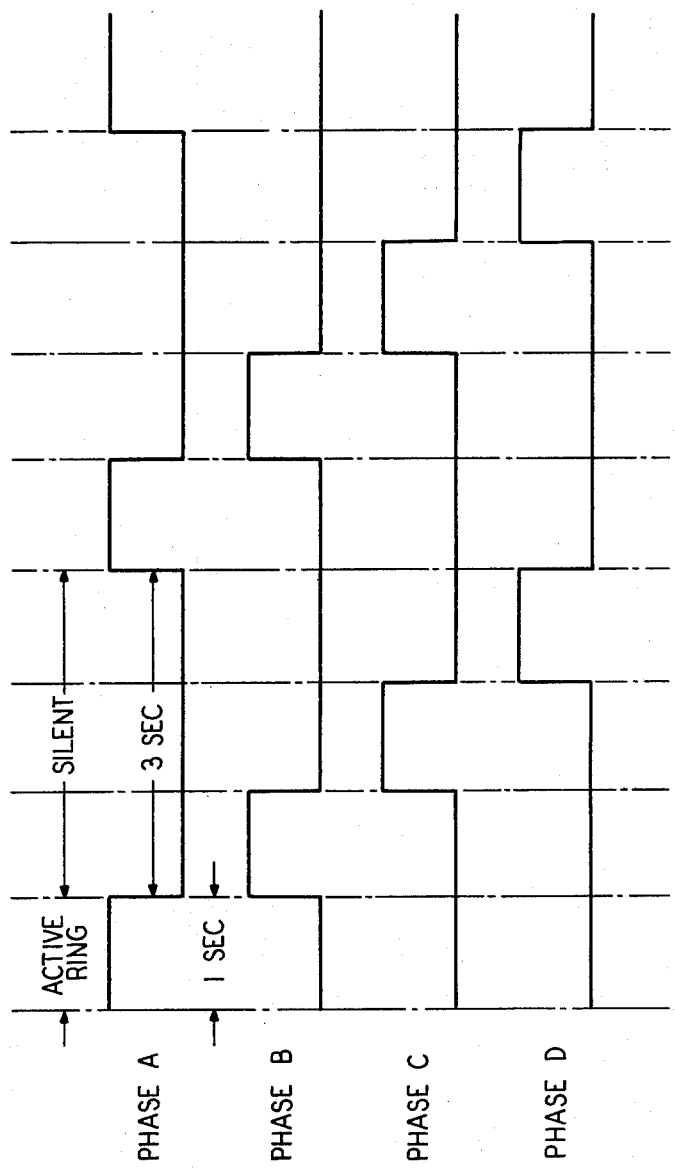
FIG. 2 is a sequence diagram which depicts four illustrative phases of ringing assigned by a time division processor for operating ringing circuitry of FIG. 2.

Each of the line circuits LC1-LC128 is further equipped with ringing control circuitry (FIG. 3) which is responsive to signals received via the bus system from the common control circuits CC for connecting and disconnecting active ringing current to and from a respective called one of the lines L1-L128. The control circuit CC advantageously partitions the operation of the ringing circuitry for a line circuit to provide four phases of ringing. As depicted in FIG. 2, the four phases A-D each comprise a cyclically recurrent one-second active period of ringing followed by a three-second silent interval under control of the control circuit CC. The active period of ringing in each of the phases A-D is time spaced and arranged uniquely to occur while the other three phases are in respective silent intervals as shown in FIG. 2.

The exemplary embodiment permits a single ringing loop current detector D1 to be shared among all lines L1-L32 within line group LG1 because only one such line is actively rung at a time during an assigned one of the ringing phases A-D. The detector is operable during the assigned phase to detect an answer signal from only the one line being rung. The ringing system is further arranged so that illustratively a maximum of four different lines in the same line group, such as group LG1, may be sequentially rung during each of the successive phases A-D. Advantageously, the ringing loop current detector shared by those four lines is sequentially connectable individually to those lines for sensing a called station answer signal during each of the active ringing intervals of all four phases A-D. Moreover, the ringing circuitry is designed so that one line in each of the line groups LG1-LG4 can be concurrently rung during each of the phases A-D. Accordingly, in the illustrative embodiment, a maximum of four lines in each of the four line groups LG1-LG4, that is a total of 16 different lines, may be rung in the four phases A-D, and one line in each line group, or a total of four lines, may be rung in each of the phases A-D.

Figure 3:
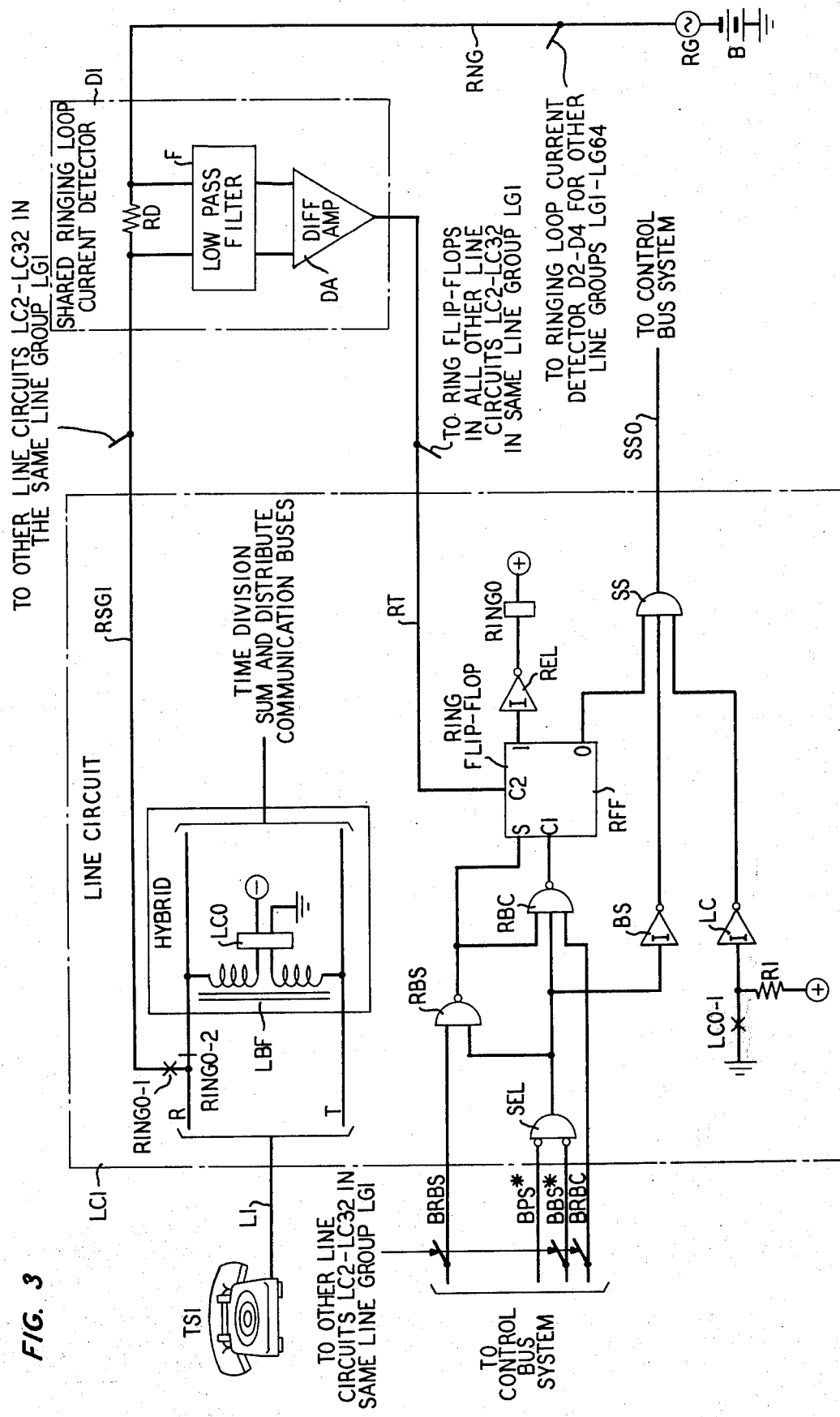
FIG. 3 shows schematically a ringing generator and a shared ringing loop current detector connected to a single line circuit having ringing control circuitry, as well as an active hybrid for TDM call communications.

In FIG. 3, the ringing arrangement for a single line group LG1 is depicted utilizing a single line circuit LC1. The latter circuit is equipped with a ring relay RINGO which is operable in response to signals received over the system buses from the common control circuits CC for connecting ringing current on lead RSG1 in any of the four phases A-D via contact RINGO-1 to the line L1 and station TS1. The control circuits CC effect the operation of relay RINGO at the beginning of an active 1-second ringing interval of a selectably assigned one of the phases A-D and causes its release to terminate that active interval and then begin a 3-second silent interval for the same phase. This ringing operation is recurrent until either the called station answers or the incoming call to that station is abandoned.

Referring to FIG. 3, a fundamental building block for the ringing control circuitry of line circuit LC1 includes a ring flip-flop RFF. It comprises conventional inputs and outputs, namely: a set input S; a pair of clear, or reset, inputs C1 and C2; and "1" and "0" outputs.

Flip-flop RFF in its idle, or cleared, state rests with a logic "1" at its "0" output and a logic "0" at its "1" output. As a consequence, relay RINGO which is connected to the "1" output of flip-flop RFF via an inverter amplifier REL, is released and withholds ringing power from line L1 at its contact RINGO-1.

When station TS1 is to be rung in response to a receipt of an incoming call, the common control circuits CC select the appropriate one of the phases A-D and apply line selection and ringing control signals to the bus system for activating flip-flop RFF. The line selection and ring control process involves a selection gate SEL, a ring bus set gate RBS and a ring bus clear gate RBC. Gate SEL is an AND gate which is in response to a receipt of coincident enabling LOW signals at its input from select leads BPS* and BBS* for producing an output for partially enabling gates RBS and RBC. Concurrently, gate RBC, an inverting AND gate, is responsive to a receipt of a disabling signal on lead BRBC for precluding a subsequent clearing of flip-flop RFF by gate RBC during an active interval of an assigned one of the ringing phases A-D. At the same time, gate RBS, an inverting AND gate, is responsive to a receipt of an enabling signal on lead BRBS for producing an output signal which further disables gate RBC and simultaneously sets flip-flop RFF for generating a logic "0" at its "0" output and a logic "1" at its "1" output. The latter action causes the operation of relay RINGO via an inverting amplifier REL. In operating, relay RING0 initiates an active interval of ringing on line L1 by closing its contact RING0-1 to extend the ringing power on lead RNG through a resistor RD of detector D1 and lead RSG1 to the ring lead R of line L1 for ringing station TS1. Active ringing continues for the full 1-second period unless the called station answers within that time.

If station TS1 does not answer the call before the expiration of ringing, the common control circuits CC control the deactivation of the ring bus set gate RBS and the activation of the ring bus clear gate RBC. The control circuits do so by applying concurrent signals to the BRBS and BRBC input leads to gates RBS and RBC. The activation of gate RBC generates an output signal which is applied to the clear input C1 of flip-flop RFF for resetting the flip-flop. In resetting, flip-flop RFF switches its "1" output to a logic "0" for effecting a release of relay RING0 via amplifier REL. Upon releasing, relay RING0 opens its contact RING0-1 for terminating the active period of ringing on line L1 and entering a 3-second silent period.

During the silent interval, the line circuit LC1 monitors the called station TS1 to detect a called party answer. Following such a detection, the ringing control circuitry signals the common control circuits CC to terminate further active ringing of station TS1 and to effect further operations of line circuit LC1 for call communication in an available one of the TDM time slots.

The monitoring action is performed in accordance with my illustrative embodiment by a loop current supervisory relay LC0 which is connected across the tip and ring leads via contact RING0-2 and inductor LBF upon the aforementioned release of relay RING0. Thereafter, relay LC0 is operative in response to current flow over the tip and ring loop resultant from the removal of the telephone handset from its cradle and the switchhook contact closure. Upon operating, relay LC0 closes its contact LC0-1 for applying to an input of an inverting amplifier LC, a ground potential instead of the positive potential via resistor R1. As a consequence, amplifier LC produces an output which enables a switchhook status AND gate SS. The enabling of gate SS, as shown in FIG. 3, is controlled by coincident input signals received from amplifier LC, the "0" output of the reset flip-flop RFF, and an inverter amplifier BS. The latter gate produces an enabling output signal as a result of the aforementioned selection signal applied by the common control circuit CC to leads BBS* and BPS*. Upon enablement, gate SS generates an output signal on lead SSO for informing the common control circuits that the incoming call has been answered and active ringing is no longer needed for station TS1.

In the event that a called party answer signal is not detected within the silent period following an immediately previous active ringing interval, the common control circuits CC effect the reoperation of relay RINGO, as already described, again to apply active ring current to line L1 for a 1-second interval. As priorly explained, the relay RING0 is operated in response to the setting of flip-flop RFF and by its "1" output signal activating amplifier REL. Flip-flop RFF is set under control of gates RBS and RBC which are respectively enabled and disabled by concurrent signals received over leads BRBS and BRBC from the common control circuits.

According to the exemplary embodiment, when a called party answers at station TS1 during the active ringing interval, ringing is tripped and thereby the active ringing interval terminated under control of the shared ringing loop detector D1. The ring tripping action is speedily performed to preclude the transmission of ringing through the receiver of the telephone to the answering party. The latter detector senses a change in D.C. (direct current) loop current flow in the series path from battery B, ringing generator RG, leads RNG and RSG1, contact RING0-1 and the L1 line loop including station TS1.

As illustrated in FIG. 3, the detector comprises a ringing detector resistor RD serially connected with leads RNG and RSG1. It also includes a low pass filter F which rejects, or blocks, 20 cycle ringing signals from being applied to a differential amplifier DA and enables DC loop current flow signals to be developed across resistor RD and passed to amplifier DA. Rejection of the 20 cycle signals is needed to preclude undesired ring tripping. Amplifier DA senses current changes developed across resistor RD by loop current flow resultant from a called station answer. Amplifier DA then generates an output ring trip signal on lead RT. The latter signal immediately controls a resetting of flip-flop RFF and, in turn, the release of relay RING0 by being applied over lead RT directly to the clear input C2 of flip-flop RFF. As indicated in FIG. 3, lead RT is multiple connected to all of the corresponding clear inputs C2 of flip-flops RFF in all other line circuits LC2–LC32 in the same line group which shares detector D1. However, as mentioned previously, only the flip-flop RFF is reset by the signal on lead RFF inasmuch as our illustrative ringing system only allows one line circuit within the same group to be rung within a selectably assigned one of the phases A-D.

When relay RING0 releases for ring tripping, it opens its contact RING0-1 to disconnect ringing current on lead RSG1 from line L1. At the same time, relay RING0 closes its contact RING0-2 and connects relay LC0 across the tip and ring leads for operation of that relay by the loop current on line L1 caused by the closed switchhook of telephone TS1 upon the called party answer. In operating, relay LC closes its contact LC0-1 for activating amplifier LC and thereby enabling gate SS to supply a switchhook status signal for station TS1 to lead SSO for informing the common control circuits that the incoming call has been answered. The common control circuits thereupon proceed to establish TDM call conversation connections within an available time slot of the time division frame as described in the aforementioned O'Neill and Knollman patent applications.

It is to be understood that the hereinbefore described arrangements are illustrative of the application of principles of my invention. In light of my teaching, it is apparent that numerous other arrangements may be devised by those skilled in the art without departing from the spirit and scope of my invention.

What is claimed is:

1. For use in a communication system having a group of communication line circuits, a switching network for establishing call connections for said line circuits, and incoming call signaling means, the invention comprising means connecting incoming call alerting signals from said signaling means to said line circuits independent of said network and being shared by said circuits for detecting call answer signals for each of said circuits, and each one of said line circuits having signaling control means activated in response to a receipt of control signals for connecting an incoming call alerting signal from said detecting means to a called line and means subsequently responsive to said detecting means detection of an answer signal on said called line for deactivating said control means to disconnect said alerting signal from said called line.

2. The invention of claim 1 wherein said signaling control means of each one of said line circuits comprises means for deactivating said signaling control means to disconnect said incoming call alerting signal and detecting means from said called line after a predetermined time duration, and wherein said each one of said line circuits further comprises a line supervisory device connectable to said called line during the disconnection of said detecting means from said called line and for sensing a call answer signal thereon.

3. The invention of claim 2 wherein said line supervisory device comprises a loop current line relay, and further comprising means controlled by a detection of a call answer signal by said shared detector detecting means and a sensing of a call answer signal by said line relay for effecting a termination of the incoming call alerting signalling.

4. For use in a communication system having a group of communication line circuits and ringing power supply means, the invention comprising a ringing line current detector permanently connecting ringing power from said supply means concurrently to each of said line circuits and for detecting line current flow over a called line during an application of ringing power from said supply means to said called line, and means for each one of said line circuits responsive to a receipt of control signals for controlling a connection of said detector through said one of said line circuits to a called line connectable thereto.

5. For use in a communication system having a group of communication line circuits and ringing power supply means, the invention comprising a ringing line current detector permanently connectable to each of said line circuits for detecting line current flow over a called line during an application of ringing power from said supply means to said called line, means for each one of said line circuits responsive to a receipt of control signals for controlling a connection of said detector through said one of said line circuits to a called line connectable thereto, and said each one of said line circuits having a supervisory device connectable to said called line for detecting loop current flow over said last-mentioned line during a disconnection of said detector therefrom.

6. For a communication system having plural groups of communication line circuits, a switching network for establishing communication call connections for said lines, ring current supply means, a plurality of call answer signal detectors connected to said supply means for extending ringing power to said line circuits independent of said switching network and common control means for supplying signals to said line circuits for selectively controlling a generation of plural phases of ringing through said line circuits to respective called lines, each of said phases having an active ringing interval followed by a silent interval and being time spaced so that each said active ringing interval for each said phase occurs during a silent interval of each of the other of said phases, said controlling signals being supplied so that each said phase is concurrently generatable for only one of said line circuits in each of said groups, the improvement comprising said line circuits in each one of said groups sharing an individual one of said detectors for detecting incoming call answer signals, switching means for each one of said line circuits including means operated in response to said supplied controlling signals for connecting incoming call ringing power for one of said phases from a respective shared one of said detectors through said one of said line circuits to a called line, and means subsequently activated by said shared one of said detectors upon a detection of a call answer signal received from said called line through said one of said circuits during an active ringing interval of said one of said phases for releasing said connecting means to terminate said last-mentioned active ringing interval.

7. The invention of claim 6 wherein each one of said line circuits further includes means connectable to said called line during a silent interval of said one of said phases for sensing a call answer signal on said called line, and means responsive to said sensing means sensing of a call answer signal on said called line for generating a signal for controlling a termination of said one of said ringing phases for said called line.

8. The invention of claim 7 wherein said sensing means comprises a loop current relay connectable to said called line during a silent interval of said one of said phases for sensing a call answer signal on said called line.

* * * * *